(12) United States Patent
Lorenzen et al.

(10) Patent No.: US 8,512,097 B2
(45) Date of Patent: Aug. 20, 2013

(54) POLISHING ARRANGEMENT AND METHOD OF POLISHING A WORKPIECE SURFACE

(75) Inventors: Kim Lorenzen, Soenderborg (DK); Jens Groenbaek, Aabenraa (DK)

(73) Assignee: Strecon A/S, Soenderborg (DK)

( * ) Notice: Subject to any disclaimer, the term of this patent is extended or adjusted under 35 U.S.C. 154(b) by 424 days.

(21) Appl. No.: 12/676,400

(22) PCT Filed: Sep. 12, 2008

(86) PCT No.: PCT/DK2008/000323
§ 371 (c)(1), (2), (4) Date: Jun. 8, 2010

(87) PCT Pub. No.: WO2009/033485
PCT Pub. Date: Mar. 19, 2009

(65) Prior Publication Data
US 2010/0255758 A1   Oct. 7, 2010

(30) Foreign Application Priority Data
Sep. 14, 2007   (DE) .......................... 10 2007 044 077

(51) Int. Cl.
B24B 51/00 (2006.01)

(52) U.S. Cl.
USPC ........................................... 451/27; 451/340

(58) Field of Classification Search
USPC ......................................... 451/5, 27, 28, 340
See application file for complete search history.

(56) References Cited

U.S. PATENT DOCUMENTS

| | | |
|---|---|---|
| 3,116,572 A | 1/1964 | Dreiling |
| 3,645,047 A | 2/1972 | Garnier |
| 3,800,475 A | 4/1974 | Portal |
| 3,959,929 A | 6/1976 | Fleischmann et al. |
| 4,024,672 A | 5/1977 | Wieck |
| 4,143,489 A | 3/1979 | Sogner |
| 4,229,908 A * | 10/1980 | Panzeri .......................... 451/242 |
| 4,512,107 A * | 4/1985 | Jones ............................. 451/160 |
| 4,573,289 A | 3/1986 | Wieck |
| 6,048,257 A | 4/2000 | Greenman et al. |
| 7,097,540 B1 * | 8/2006 | Gosinski et al. .................. 451/8 |
| 2002/0025757 A1 * | 2/2002 | Gross ................................ 451/5 |
| 2002/0031987 A1 | 3/2002 | Liners et al. |
| 2004/0259471 A1 | 12/2004 | Antenen |

FOREIGN PATENT DOCUMENTS

| | | |
|---|---|---|
| DE | 2203646 | 8/1972 |
| DE | 2320349 | 12/1974 |
| DE | 2742113 | 3/1979 |
| DE | 2854620 | 7/1980 |

(Continued)

OTHER PUBLICATIONS

International Search Report for PCT/DK2008/000323 dated Jan. 7, 2009.

*Primary Examiner* — Dung Van Nguyen
(74) *Attorney, Agent, or Firm* — McCormick, Paulding & Huber LLP

(57) ABSTRACT

The invention concerns a polishing arrangement (1) with a tool holder (3), at which a polishing tool is arranged and that interacts with a workpiece holder (5), the workpiece holder (5) and the tool holder (3) being movable in relation to one another in a first direction and in a second direction differing from the first direction. It is endeavored to make at least a part of the polishing process reproducible and documentable. For this purpose, in a third direction (20) that is perpendicular to the first (9) and second (10, 12) directions, the tool holder (3) is made to be flexible.

17 Claims, 5 Drawing Sheets

(56) References Cited

FOREIGN PATENT DOCUMENTS

| | | |
|---|---|---|
| DE | 19947006 A1 | 4/2000 |
| JP | 53-147512 A | 12/1978 |
| JP | 63-200986 A | 8/1988 |
| JP | 5337813 | 12/1993 |
| JP | 08-071895 A | 3/1996 |
| JP | 10-277958 A | 10/1998 |
| JP | 2005-288684 A | 10/2005 |
| WO | 2007017524 A1 | 2/2007 |
| WO | 2009095018 A1 | 8/2009 |

* cited by examiner

POLISHING ARRANGEMENT AND METHOD OF POLISHING A WORKPIECE SURFACE

CROSS REFERENCE TO RELATED APPLICATIONS

This application is entitled to the benefit of and incorporates by reference essential subject matter disclosed in International Patent Application No. PCT/DK2008/000323 filed on Sep. 12, 2008 and German Patent Application No. 10 2007 044 077.6 filed Sep. 14, 2007.

TECHNICAL FIELD

The invention concerns a polishing arrangement with a tool holder, at which a polishing tool is arranged and that interacts with a workpiece holder, the workpiece holder and the tool holder being movable in relation to one another in a first direction and in a second direction differing from the first direction. Further, the invention concerns a method of polishing a workpiece surface.

BACKGROUND OF THE INVENTION

Such a polishing arrangement is, for example, known from DE 27 42 113 A1. The polishing tool is adapted to reciprocate in a first direction. The workpiece in which the polishing tool dives is brought to rotate, so that a movement in a second direction between the polishing tool and the workpiece occurs. From the outside the workpiece is held by support wheels, which are at the same time driven to be rotating in order to rotate the tool.

Polishing, grinding and honing are methods of machining a surface to cause a material cutting with indefinite blades. Other machining methods, such as turning and milling, cause a cutting deformation of a surface with controlled cutting. Here, traces of the cutting are practically not avoidable.

While during grinding the surface machining practically exclusively results in a material cutting, polishing causes a plastic or partially plastic forming of roughness peaks on the surface structure, thus evening them out. The surface machining methods occurring in the micro or nano areas in the border area between micro-grinding and polishing have still not been completely explored in a scientific manner.

Also today, polishing of certain surfaces still takes place in a practically exclusively manual procedure. This is, for example, the case with tools to be used for the reshaping of metallic workpieces, for example by means of the cold flowing technique. Here, the structure of the polished tool surface has a crucial influence on the reshaping process and on the life duration of the reshaping tools. For the polishing, rotation-symmetrical reshaping tools are, for example, suspended in a rotary chuck of a polishing bench or a turning lathe and brought to rotate. An employee then polishes the function surfaces of the reshaping tool by means of a polishing tool that he reciprocates manually in parallel to the alignment. Polishing tools are typically polishing stones, for example made of silicium carbide (carborundum), or wooden sticks in connection with polishing means, for example diamond paste. During the polishing procedure, the employee frequently checks the result and varies different parameters, for example, the contact pressure, the rotation speed and/or his hand movement, and replaces the polishing tool on need, in order to make a stepwise approach to the desired polishing result. Each replacement of the polishing tool requires a careful cleaning of the surfaces to be polished to remove remains of the coarse polishing means before continuing the polishing with a finer polishing tool. Otherwise, remaining coarse polishing means can cause tracks on the workpiece surface during the subsequent polishing steps.

Thus, the polishing requires a substantial experience of the employee. Various parameters, which the employee can influence, will influence the polishing result, for example the way in which the employee performs his hand movement, when and how he replaces the polishing tool and how well he adapts the individual polishing steps to each other. In systems used for series production of products in large numbers, for example, cold moulders, in which uniform reshaping tools or reshaping tool parts are typically used in amounts of several hundreds of pieces per year, it is a disadvantage that the properties of such reshaping tools are dependent on the manual work of various employees. Thus, differences in the polishing quality cause too large deviations in the operating life of the reshaping tools. In this case the scatter range may scatter by a factor of 3 to 5.

The control of the polished surfaces is difficult. Thus, it will not be sufficient to evaluate the gloss of the surface. Reshaping tools with gleaming and thus apparently strong surfaces may fail quickly, if the surfaces have not been achieved through the correct polishing steps.

As it takes great effort to test the final quality of the surfaces, such tests are only made sporadically. The lack of process and product documentation counteracts the ensuring of a constant manufacturing quality and corresponds very poorly to the present documentation requirements, in particular in connection with certified manufacturing processes or systems.

Due to the large share of manual work, the manual polishing of reshaping tools is also very expensive. Further, the manual movements and the pressure to be performed cause a work load on the employee, particularly because typically these bodily working movements have to be performed for a whole workday at a time.

Additionally, the employee can only move the polishing tool at a limited speed and a limited contact pressure. In order to provide the polishing process with the mechanical output required for a good and fast polishing result, the rotation of the workpiece is usually chosen to be relatively fast. Consequently, the polishing path, that is, the path described by the polishing tool across the workpiece surface, runs substantially tangentially to the rotation of the workpiece, that is, substantially circularly. Typical machining tracks, such as rotation tracks, originating from former machining steps on the workpiece, typically also run tangentially and can therefore only difficultly be removed by means of manual polishing, which causes either long polishing durations or a poor end quality.

The relatively large hand movements of the employee—typically in the range of several centimeters—further cause that the axially central area of the workpiece is substantially more polished than the end areas. This is particularly the case with small workpieces. This axial irregularity of the polishing process also causes long polishing durations or poor polishing results in the area of the axial ends of the workpieces.

DE 199 47 006 A1 shows a grinding block holder that is used to perform the final grinding of a vehicle brake drum. The grinding block holder comprises a tool holder in which several grinding tools are inserted. The tool holder is fixed with bolts and springs to a holder in such a manner that it can move with several degrees of freedom. The force, with which the tool holder acts upon the workpiece, is set by means of a positioning.

US 2002/0031987 A1 shows a device, in which the surface of a disc is smoothed by honing. The tool used for the honing is suspended in a cardan-like manner, meaning that it can adjust its position in relation to the workpiece freely within certain limits.

SUMMARY OF THE INVENTION

The invention is based on the task of making a polishing process at least partially reproducible and fit for documentation.

With a polishing arrangement as mentioned in the introduction, this task is solved in that, in a third direction, in which the tool holder is perpendicular to the first and second directions, the tool holder is made to be flexible.

Thus, the third direction is practically perpendicular to the workpiece surface of a workpiece that is held in the workpiece holder. In the simplest case, the movement of the workpiece holder is transferred directly to the workpiece. Due to the flexible embodiment, the polishing tool can be pressed against the surface with a certain power. In this connection, the tool holder is guided mechanically, so that the movements in the first and the second directions can be carried through under the control of a machine. In this connection, the positioning in the third direction is less critical. Due to the flexible embodiment of the tool holder, the polishing tool adapts to the surface of the workpiece and due to the relative movements it slides in the first and second directions across the surface of the workpiece to polish it. A change of the position of the tool holder in the third direction causes a slight increase or reduction of the contact force, which is, however, usually still acceptable by the polishing process. The use of a machine for the polishing makes it possible to document and reproduce the polishing process. The relative movements between the workpiece and the tool can be generated in different manners. The workpiece can be arranged in a workpiece holder that is part of the polishing arrangement. The workpiece holder can also be made separately from the polishing arrangement, so that for polishing the tool holder is approached to be workpiece—or vice versa—by the polishing arrangement, for example by means of rails in the floor. The workpiece holder can, for example, be a turning lathe or another machine tool that is arranged separately from the polishing arrangement. This can cause an overall reduction of the efforts of handling the workpiece during manufacturing.

Preferably, in the third direction the tool holder has its smallest rigidity. Thus, the tool holder will be more rigid in the first and second directions. The polishing tool can then be moved by a certain force in the first direction without risking a deformation of the tool holder. Thus, a relatively accurate control of the movement of the polishing tool can be achieved, so that the polishing tool can be guided along predetermined polishing paths. The rigidity of the tool holder in the first and second directions must be so large that in the first and second directions the polishing tool does not vibrate or oscillate. As, in the third direction, the tool holder is made to be flexible, it has a substantially smaller rigidity in the third direction. The rigidity in the first direction is at least five times the rigidity in the third direction, that is, in the first direction at least five times the force is required to deform the tool holder to the same extent as in the third direction.

Preferably, in the second direction, the tool holder has a rigidity that is at least five times larger than the rigidity in the third direction. Also this helps preventing that the polishing tool is displaced tangentially or brought to vibrate by the movement in relation to the workpiece.

Preferably, the tool holder has a length that is at least ten times its maximum effective diameter. With a circular cross-section, the effective diameter would be the diameter. If the cross-section deviates from the circular shape, the effective diameter is the square root of the cross-sectional surface. The use of a relatively long tool holder has two advantages. Firstly, with such a long tool holder, it is also possible to penetrate into the workpieces to polish them there, even though they only have very little open space inside them. Secondly, this automatically ensures the poor rigidity, that is, the flexible property, in the third direction in a comfortable manner.

Preferably, a drive is provided that overrides the relative movement between the workpiece holder and the polishing tool by an additional, oscillating movement. By means of the relative movement between the workpiece holder and the polishing tool, a polishing path can be defined, along which the polishing tool is guided across the workpiece. The polishing process then occurs in that the polishing tool oscillates. In the simplest case the polishing tool then performs a sine-shaped movement around the polishing path.

It is preferred that the oscillating movement has a frequency in the range from 20 to 100 Hz. Thus, it is possible to move the polishing tool at a relatively high speed across the surface of the workpiece to be polished that is accommodated in the workpiece holder. If the oscillating movement occurs in the first direction, the oscillation with the frequency mentioned can cause that the influence of the movement in the first direction becomes at least as large as the influence of the movement in the second direction. It is also possible to move the polishing tool across the surface of the workpiece in such a manner that almost each spot is passed by the polishing paths under different angles. This ensures an excellent polishing result.

Preferably, the oscillating movement has an amplitude in the range from 0.05 to 5 mm. Expediently; the amplitude of the oscillating movement is smaller than the extension of the polishing tool in the direction of the oscillating movement. Thus, a very uniform distribution of the polishing work performed in the first direction can be achieved.

Preferably, the drive is connected to a control device that changes an oscillating frequency and/or an oscillation amplitude. The change can be controlled by a random generator or by a program. It is also possible to activate the control device manually. The change of parameters of the oscillation movement helps preventing that interference patterns are formed on the surface, which would otherwise occur during a sine-shaped movement. By means of the control of the parameters of the oscillation movement, it is additionally possible to influence the polishing process.

Preferably, the control device controls the relative movement in the second direction at a lower speed than the oscillating movement. This applies at least for a part of the polishing process. Thus, polishing paths can be generated, which have a main component in the first direction.

Preferably, the polishing tool is movable in the first direction and the workpiece holder is movable in the second direction. This means that different drives can be used for the movements in the different directions. The decoupling of the movement control makes it easier to guide the polishing tool along a predetermined path.

Preferably, the workpiece holder rotates at a speed in the range from 50 to 100 rpm. Particularly with rotation-symmetrical workpieces such an embodiment is advantageous. If the workpiece is rotated by the workpiece holder, a simple linear movement of the polishing tool in parallel to the rotation axis will ensure polishing of all areas of the workpiece that are to be polished. Also the front side of the workpiece can be polished by a rotary movement.

Advantageously, several tool holders with different flexibility properties are provided. As, by means of the flexibility properties, that is, the rigidity of the individual tool holders, the polishing process can be influenced, a tool holder can then be chosen which is suited for a desired polishing process.

It is preferred that different polishing tools are provided with different coding, each coding only fitting with at least one predetermined tool holder. With advancing polishing steps finer polishing tools must be used. With a finer polishing tool, it is expedient also to use a smaller contact pressure. If the use of tool holders with different rigidities can influence the contact pressure, the control of the movement of the tool holder gets simpler. Basically, the tool holder can then be moved in the same manner in all steps of the polishing process, so that no changes must be made to the polishing arrangement, except for the replacement of the tool holder and the polishing tool. By means of the coding it can be ensured that a certain polishing tool is not acted upon by a too large force. Expediently, a tool holder is provided for each fineness of the polishing tool.

Preferably, the polishing tool is fixed to the tool holder by means of an intermediary holder. This simplifies the handling.

Preferably, the tool holder is arranged on a handling automat with at least two movement axes. The handling automat can, for example, be a traditional industrial robot. Such an industrial robot often even has six movement axes, namely three translatory and three rotary movement axes.

Preferably, the drive and/or the tool holder and/or the handling automat are provided with movement and/or power sensors. These sensors make it possible for the polishing arrangement to measure the movements of the polishing tool in relation to the workpiece and/or the forces between the polishing tool and the workpiece. In this way, for example the wear of the polishing tool can be monitored and compensated.

Preferably, the workpiece holder and the tool holder have a changeable angle in relation to one another. In particular in connection with the oscillating additional movement between the workpiece and the polishing tool, this enables the setting of movement paths of the polishing tool across the workpiece, which have in practically each point of the surface to be polished relatively many directions. This improves the polishing result.

Preferably, a contact pressure of the polishing tool on the workpiece is controllable, in particular in dependence of the position of the polishing tool on the workpiece. With this embodiment, each polishing process can work each spot with the contact pressure that gives the best result. If, for example, a workpiece with contours must be polished, a contour formed by an inner radius may require a different contact pressure than a contour formed by an outer radius or a straight of cylinder shaped surface. The controllable contact pressure also enables an adaptation of the polishing process to different materials or surfaces.

It is preferred that the polishing arrangement comprises a contact pressure arrangement operated by a pressure fluid, in particular pressure air, said contact pressure arrangement influencing the contact pressure. This contact pressure arrangement can be integrated in the handling automat. However, it can also be located between the handling automat and the tool holder. The use of a pressure fluid is a particularly simple measure. The pressure in the pressure fluid determines the force, with which the contact pressure arrangement acts upon the polishing tool. A gaseous pressure fluid has the additional advantage that it is to a certain limit compressible, so that here an additional flexibility is built in that has a further favourable effect on the polishing process. Pressure air is in most manufacturing plant available anyway.

Preferably, the pressure of the pressure fluid is controlled by a control device. By changing the pressure, the control device can in a simple manner adjust the desired contact pressure of the polishing tool on the workpiece.

The invention also concerns a method of polishing a workpiece surface, during which a premachining forms microscopic recesses in the surface and the polishing changes a part of the surface that projects between the recesses. With such an embodiment, it is enabled that lubricants can distribute well in the surface. The depth of the recesses formed during the premachining can, for example, be in the range from 1 to 10 μm, preferably from 3 to 5 μm. The remaining surface is polished, so that a workpiece surface with excellent properties is obtained. In this connection, it is sufficient only to polish the part of the surface projecting between the recesses. The reason why the recesses can remain unmachined is that this does not prevent the distribution of lubricants.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENTS

Figure 1:
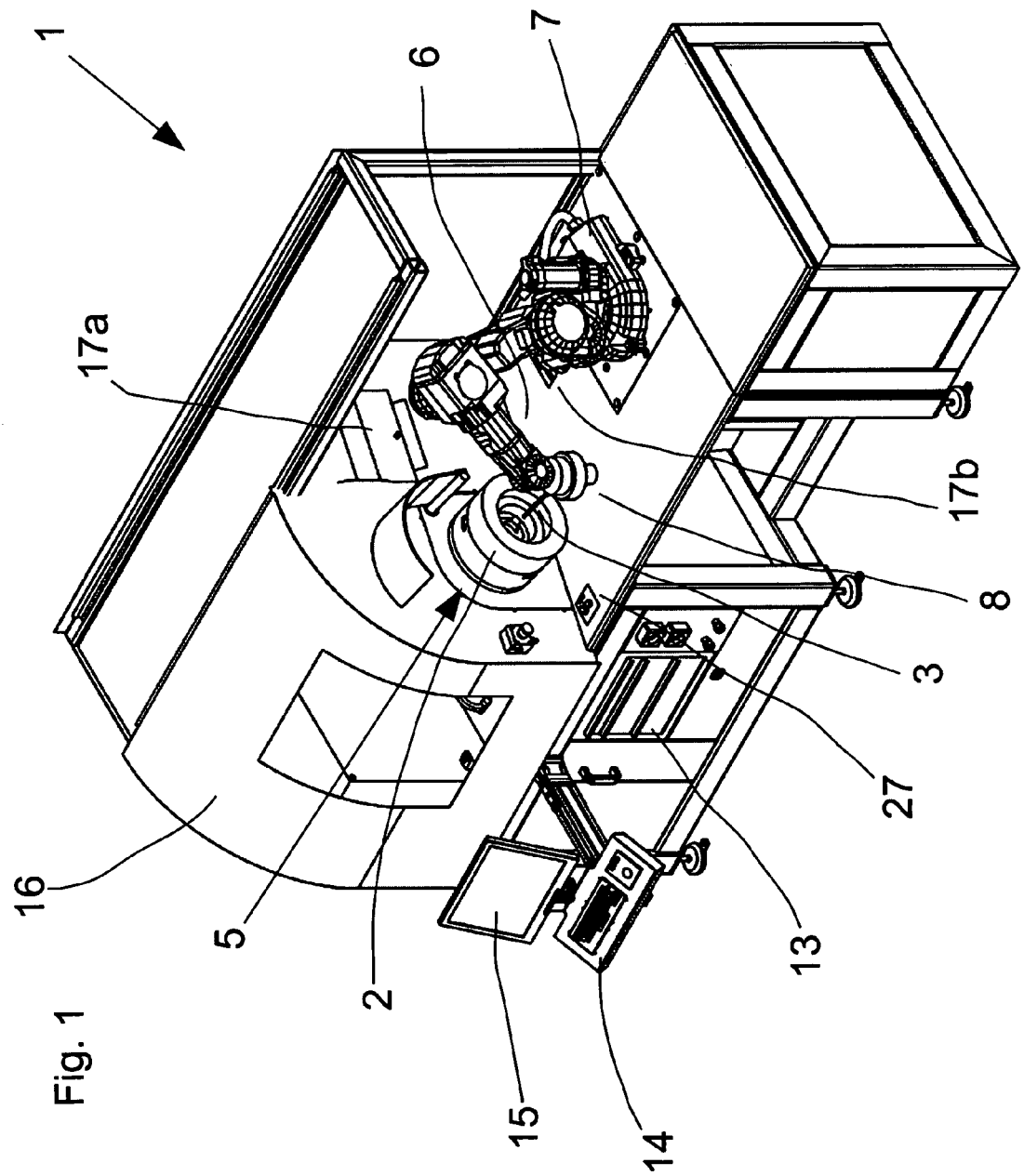
FIG. 1 is a schematic view of a polishing arrangement.

In the operational state, a polishing arrangement 1 shown in FIG. 1 comprises a workpiece 2 and a polishing tool 4 (FIG. 2) arranged on a tool holder 3.

In the present case, the workpiece 2 is made to be rotation-symmetrical and can therefore be held in a workpiece holder in the form of a rotary chuck 5. When the rotary chuck 5 rotates, the workpiece 2 is caused to perform rotary movements.

The tool holder 3 is arranged on an arm 6 of a handling automat 7, that is, an industrial robot. The handling automat 7 has a total of six movement axes, that it, it can move an oscillation drive 8 arranged at the top of the arm 6 in three translatory directions and swivel it around three rotation axes. The tool holder 3 is connected to the oscillation drive 8.

The oscillation drive 8 can, for example, comprise a traditional eccenter drive that converts the rotation of a motor into a linearly oscillating movement. In the following, the direction of this movement will be called "the first direction 9".

Figure 2:
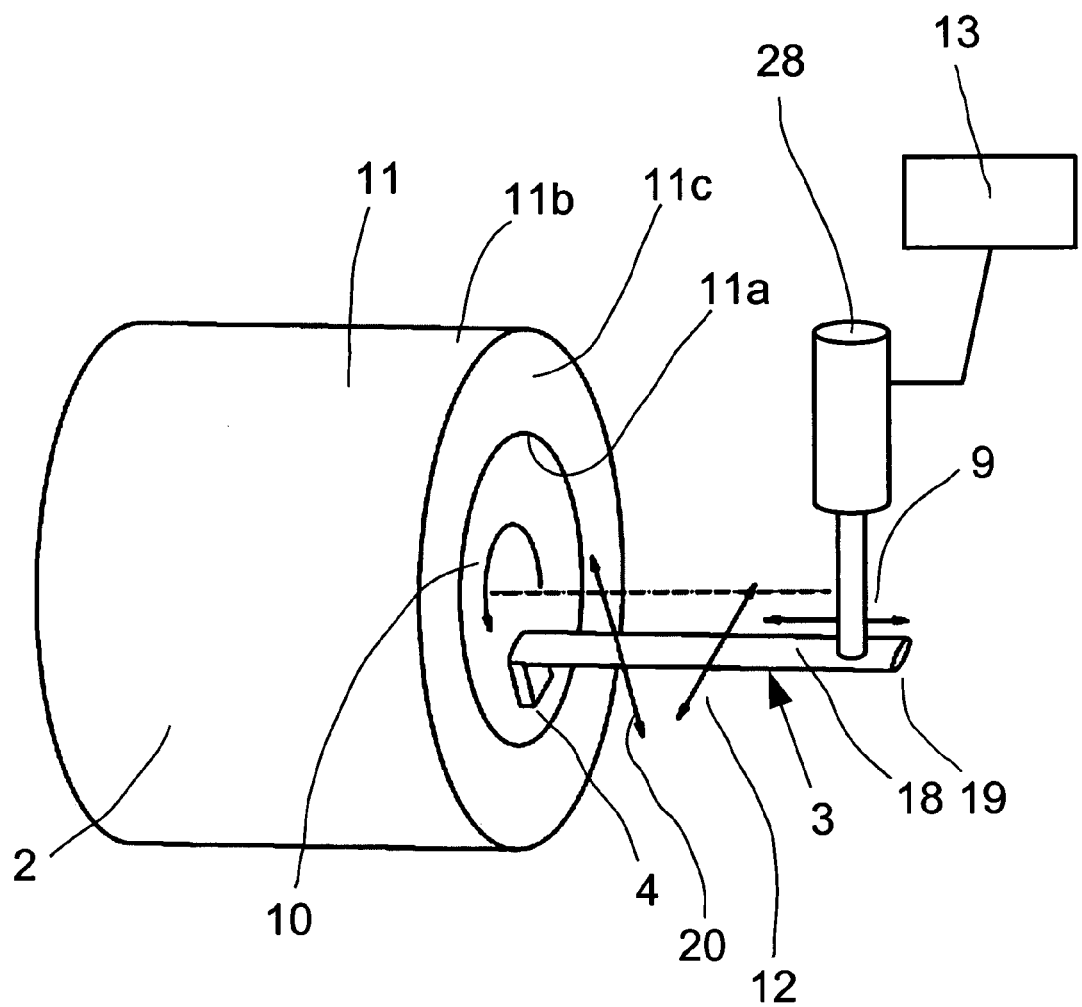
FIG. 2 shows a first embodiment of a tool holder with a polishing tool at a workpiece.

The arm 6 of the handling automat 7 can bring the tool holder 3 and thus the polishing tool 4 into practically any random positions and orientations in relation to the workpiece 2. When the rotary chuck 5 rotates, the surface of the workpiece 2 moves in a second direction 10 (FIG. 2). Thus, the movement in the first direction 9 is controlled by the handling automat 7, this movement also overriding an oscillation movement that is controlled by the oscillation drive 8. The movement in the second direction 10 is generated by the rotary chuck 5. Overlapping the movement in the first direction 9 and in the second direction 10, practically any point on the inside 11a or the outside 11b of the workpiece 2 can be reached. In FIG. 2 an arrow has been added to that shows the second direction locally in relation to the tool holder 3.

A control unit 13 that can be activated by a keyboard 14 with screen 15 controls both the movement of the handling automat 7 and the movement of the rotary chuck 5. Additionally, the control unit 13 can also control the oscillation drive 8, that is, change its frequency and/or amplitude. This change of frequency and/or amplitude can be effected by a random generator. It is also possible to make this change under program control.

A protecting cap 16 is laterally displaceable, so that the workpiece 2 and the tool holder 3 are accessible for an operator. During an automatically performed polishing process, however, the protecting cap 16 is pushed over the rotating workpiece 2 and the handling automat.

A towel holder 17a holds paper towels, which are usually also soaked with alcohol or another cleaning agent to clean the workpiece 2 after each part of a polishing process. Behind the handling automat a waste paper basket 17b is provided for the disposal of used towels.

The protecting cap 16 is provided with a safety switch (not shown) that ensures during opening of the protecting cap 16 that the control unit can neither activate the rotary chuck 3 nor the handling automat 7. However, in order still to permit manual polishing at the polishing arrangement 1, an operating field 27 is provided, via which the employee can activate and control the rotary chuck. Thus, it is ensured that the employee is not wounded by machine-controlled units.

FIG. 2 now shows the interaction of workpiece 2 and tool holder 3 in an enlarged measure. The tool holder 3 has the form of a rod 18 with a cross-section 19. Here, the cross-section 19 is oval, that is, it is larger in the second direction 12 than in a third direction 20 that is perpendicular to the first direction 9 and the second direction 12. The length of the rod 18 amounts to at least ten times the active diameter of the cross-section 19. With a circular cross-section 19, this would be the normal diameter. If the shape of the cross-section 19 deviates from the circular shape, the active cross-section is the root of the cross-sectional surface.

The polishing tool 4 located at the top of the tool holder 3 may have the form of a honing stone. The tool holder 3 is led in a predetermined manner by the handling automat 7 in the axial direction. The movement caused by the handling automat 7 is overridden by an oscillation movement in the first direction 9. The frequency of this movement is in the range from 20 to 100 Hz. The amplitude of this movement is in the range from 0.05 to 5 mm. The rotary speed of the rotary chuck is in the range from 50 to 1000 rpm. The amplitude is chosen so that it is smaller than the length of the polishing tool 4 in the first direction. This enables a very uniform distribution of the polishing work performed in the first direction.

In a manner not shown in detail, the handling automat 7, the arm 6 of the handling automat 7 and/or the tool holder 3 can be equipped with acceleration and or power sensors, which make it possible for the control device 13 to measure the movements of the polishing tool 4 and/or the powers between the polishing tool 4 and the workpiece 2 in up to three axes. Thus, for example, the contact pressure or the wear of the polishing tool 4 can be monitored and compensated.

Figure 3:
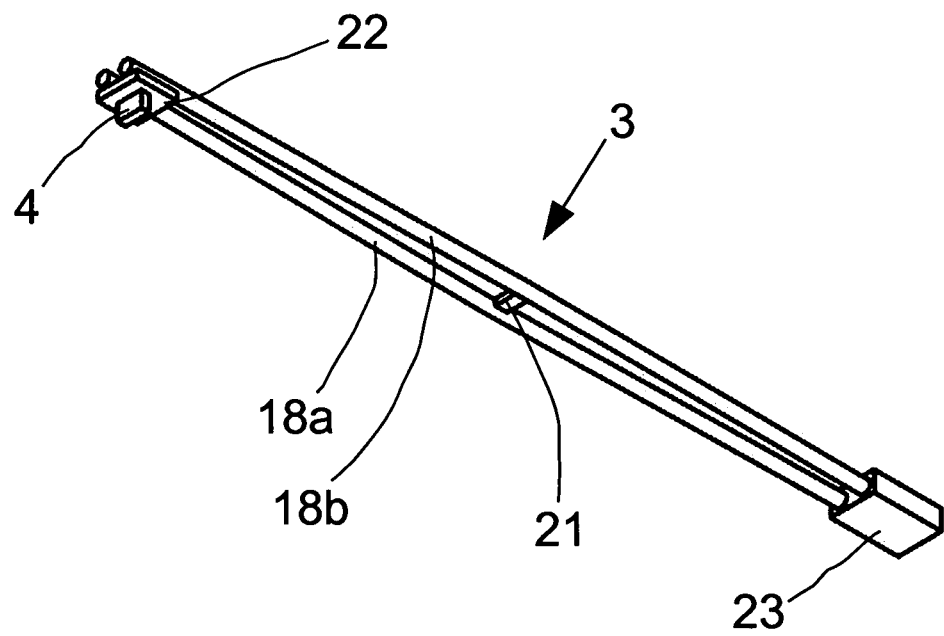
FIG. 3 shows a second embodiment of a tool holder.

FIG. 3 shows a modified embodiment of a tool holder 3. This tool holder 3 comprises two rods 18a, 18b, which are connected to one another by means of a strut 21 in the second direction.

At one end is the polishing tool 4 that is fixed to the tool holder via an intermediary holder 22. At the other end is a fitting 23, with which the tool holder 3 is connected to the oscillation drive 8.

Advantageously, the tool holder 3 can be made of carbon or fibre glass reinforced plastic or of a light metal, for example, titanium. The rod(s) 18, 18a, 18b of the tool holder 3 can further be made, for example, in the form of a tube, several, thinner rods in a common sleeve or as a grid structure. The polishing tool 4 can be connected to the tool holder 3 by means of, for example, an adhesive, screws or a latch connection.

The designs of the tool holder shown in FIGS. 2 and 3 cause that in the first direction 9 the tool holder 3 has the largest rigidity. In this direction, the tool holder 3 is practically not flexible.

In the second direction 12, the tool holder 3 has a somewhat smaller rigidity. In the third direction 20, however, the tool holder 3 is made to be flexible, that is, it has a relatively low rigidity. The rigidity in the second direction 12 is at least five times as large as the rigidity in the third direction 20. If the same force is permitted to act in the second direction 12 and the third direction 20, the tool holder 3 deforms at least five times as much in the third direction 20.

By means of this flexible bearing of the polishing tool 4, the control of the handling automat 7 can take place with a certain tolerance. In relation to the view in FIG. 1, the handling automat 7, for example, guides the tool holder 3 so that that contact point of the tool holder 3 at the oscillation drive 8 is always some millimeters below the inside 11 of the workpiece 2. Thus, the tool holder 3 is deformed in the third direction 20. The polishing tool 4 then rests on the inside 11 of the workpiece 2 with a certain force.

Alternatively, after putting in the workpiece geometry, the control unit 13 can perform a program-controlled movement of the tool holder 3, to keep the distance in the third direction 20 between the workpiece 2 and the polishing tool 4 approximately constant during the polishing process. With simple workpiece geometries, the input can consist of individual parameters, for example, the axial extension of the workpiece and of the polishing tool. Complicated workpiece geometries can, for example, be adopted directly from a design program, be put in by the operator in a computer-aided manner or be measured automatically by the system.

If the polishing tool 4 is worn or a different polishing tool is to be used, usually a change of the movement control of the handling automat 7 will not be required. Small changes in the forces acting upon the polishing tool 4 will occur. However, these changes are still within an acceptable range.

Figure 4:
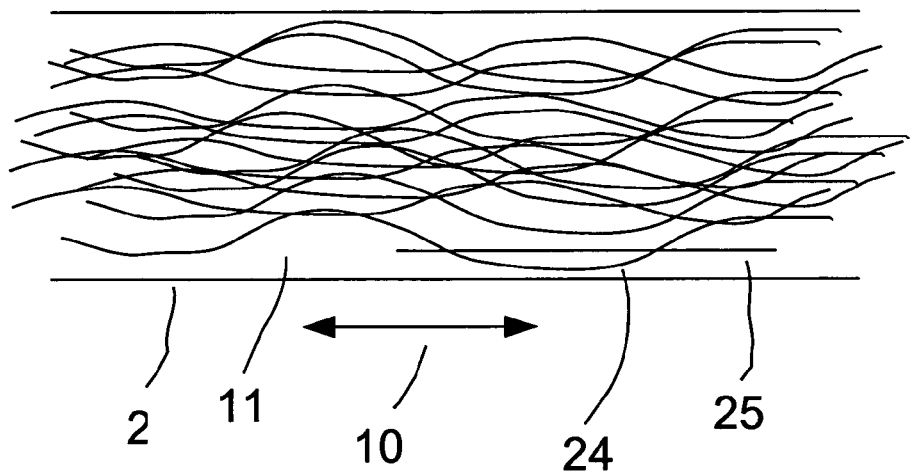
FIG. 4 is a schematic view of a workpiece surface with polishing tracks according to the state of the art.

When the polishing tool 4 is guided across the inside 11 of the workpiece 2, the process according to the state of the art (FIG. 4) would result in wave-shaped polishing tracks 24 that extend substantially in the second direction. If a defect 25 exists that extends in the same direction 10, this defect 25, for example a turning track, can practically not be removed by the polishing.

Figure 5:
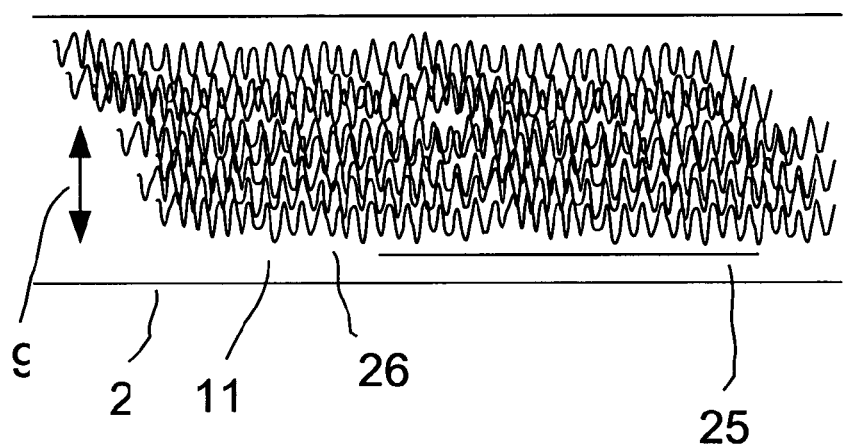
FIG. 5 shows the polishing tracks according to the invention.
Figure 6:
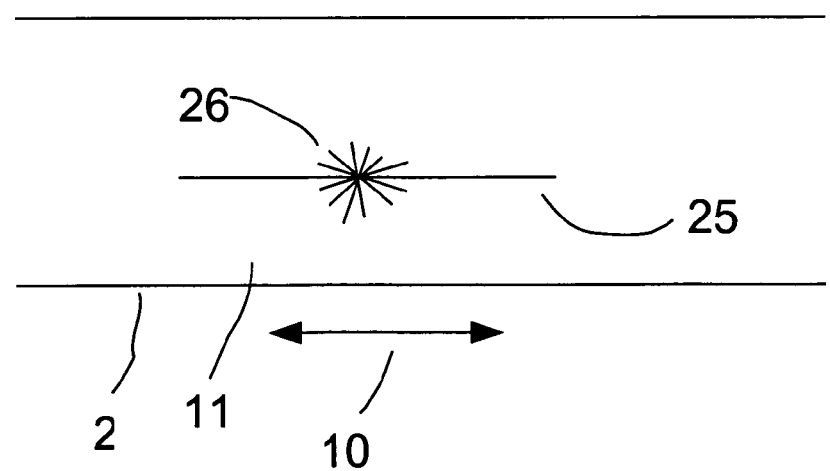
FIG. 6 is a section of FIG. 5.

FIG. 5 shows polishing tracks 26 according to the present invention. It can be seen that these polishing tracks have different wave lengths, amplitudes and positions in the first direction 9. If such polishing tracks meet the defect 25, this defect 25 will be removed faster and more reliably, as there is a higher number of polishing tracks 26 having a relatively large angle in relation to the defect 25. This is also shown in FIG. 6 in an enlarged view.

Usually, several polishing processes will have to be performed to completely polish the workpiece 2, each polishing process comprising the use of a finer polishing tool 4 than the previous step. In the present case, this selection will still be made by an operator. The operator can also check, if the polishing process with a polishing tool 4 has already given the desired effect, or if it has to be prolonged.

Under certain circumstances, a finer polishing tool requires a smaller contact pressure. In order to ensure this in a simple manner, each polishing tool 4 has its own tool holder 3. Of course, a tool holder 3 can also be provided for a group of polishing tools 4. Tool holder 3 and polishing tool 4 are then coded to fit with each other. This coding can simply take place in that the polishing tool 4 of a specific quality has a fixing geometry that only fits with the fixing geometry of one specific tool holder 3. If then, the polishing tool 4 has to be replaced, the total tool holder 3 is detached from the handling automat and a new tool holder is mounted. However, the operator can be supported in that after a polishing process a screen 15 shows the polishing tool 4 that would be expedient for use during the next polishing process.

As mentioned above, the contact pressure of the polishing tool on the workpiece can be controlled. For this purpose, expediently a contact pressure device 28 is provided that can be operated with a pressure fluid, for example, pressure air. The pressure of the pressure fluid can be controlled by the control device 13. For this purpose, the control device 13 can be connected to a pressure or power sensor that is not shown in detail. In FIG. 2, the contact pressure device is shown to act upon the rod 18. However, this location only represents an example. The contact pressure device can also be arranged elsewhere, for example in the handling automat 7 or in the oscillation drive 8. By means of the pressure or power sensor mentioned above, it is also possible to control the contact pressure.

It may be expedient to select the oscillation speed of the polishing tool 4, that is, the movement in the first direction 9, to be higher than the movement of the surface to be polished in the second direction 12. By changing the speed relations, different angles can be set, with which the polishing tool 4 is guided across the surface to be polished. If the movement in the first direction 9 is larger than the movement of the surface to be polished in the second direction 12, the major part of the polishing tracks extend mainly across the machining tracks appearing most frequently in connection with rotation-symmetrical workpieces, meaning that these tracks are removed faster.

By means of the handling automat 7 also the angle alignment between the tool holder 3 and the workpiece 2 can be changed, in order to achieve a different angle of the movement of the polishing tool 4 during each stroke of the oscillation movement, as shown in FIG. 6. Thus, it is also possible to polish non-rotation-symmetrical workpieces and front sides 11c of workpieces.

The control unit 13 or another computer can be used to precalculate the variation of the frequencies, amplitudes and axial tool positions. For this purpose, for example, already known optimisation methods can be used, for example to ensure that each point of the workpiece surface 11 to be polished is crossed by polishing tracks 26 having the largest possible angle variation. The calculation can be made in consideration of the previous machining history, if, for example, it is known, in which areas of the workpiece surface 11 turning tracks 25 typically exist. For example, the axial distribution of the polishing work can be controlled accordingly. Further, the frequency and the amplitude of the oscillation movement of the polishing tool can, for example, take place in dependence of the radial distance of the polishing tool 4 from the rotation axis of the workpiece 2 and/or in dependence of the fineness of the polishing tool 4 used, so that the relative speed (that is, peak or effective values) is held within prespecified limits.

The arrangement 1 according to the invention is surprisingly well suited for polishing reshaping tools 2 for cold flowing. Particularly in this branch, manual polishing is used everywhere, as until now experience has shown that it would not be possible to replace the experience and the judgment ability of human workers by machines. Before polishing reshaping tools 2, the surface is usually shaped to finish size with a very high accuracy by machining processes, such as hard turning, grinding, milling or erosion. The polishing process should therefore not change the geometry of the surface 11, but refine the micro-structure and the roughness quality of the surface 11. This is different from polishing the surface of other metallic products, for example, commodities, water armatures, plastic moulds or products with mirror surfaces, which are usually polished with the one purpose of avoiding optically recognisable patterns or errors. Therefore, such workpieces must not only be polished very finely, but also without long-wave or macroscopic shape errors. With reshaping tools 2, however, the polishing process can take place in relation to the premachined surface 11 and therefore be made with a relatively flexible positioning of the polishing tool 4.

After premachining the unmachined workpiece 2, machining tracks 25 remain at the surface 11, and the purpose of the polishing is to remove these machining tracks 25 without damaging the microstructure of the surface 11. In particular, it must be avoided that the metal grid structure immediately below the surface 11 is damaged, for example due to fatigue. When polishing with the arrangement 1 according to the invention, projecting machining roughnesses and tracks are eventually removed in a careful manner, which makes the upper layer of the surface 11 increasingly smooth, whereas the structures of the layers immediately below the surface are maintained. Larger structures, for example, steps will survive the polishing process, however, in a smoothed form. Such structures, however, have only little influence on the quality or the life of a reshaping tool for the cold flowing.

The arrangement 1 according to the invention is also excellently suited for machining the surface of a workpiece in such a manner that an evenly distributed, microscopic cutting appears. For example, a material layer of only 1 μm or less can be cut off across the complete workpiece surface, the cutting and the distribution of the cutting on the surface 11 being completely and exactly controllable. In a surprising manner, this enables completely new machining processes and thus also the manufacturing of completely new surface structures.

It is already known to form recesses or grooves, for example by honing, in a workpiece surface, for example in the sliding surfaces of a machine component, the recesses being suited for the accommodation and distribution of oil or other lubricants. This simplifies the distribution of the lubricant in the sliding surfaces during operation of the machine. The reliable lubrication thus increases the life of the sliding surfaces. Methods known until now for making such recesses, however, involve disadvantages. Firstly, the depth and the width of the recesses are substantially controlled by the choice of the machining tool, for example the honing stone. Thus, only a relatively rough control of these parameters is possible. Secondly, the share of the workpiece surface that is provided with recesses is controlled by changing the machining duration. In order to achieve a high surface share of recesses, the machining tool must be guided across the workpiece surface several times. In this connection, the machining tool can only be roughly positioned in relation to the width of the recesses. This increases the risk that the distribution of the recesses on the workpiece surface gets irregular, meaning that the rigidity and the lubrication properties of the sliding surface can be influenced.

With the method according to the invention of polishing a workpiece surface of a workpiece it is now possible to provide relatively deep, but still microscopic, recesses in a workpiece surface, the relative share of the surface used for the recesses and the distribution of the recesses across the surface being accurately controllable. This is achieved in that microscopic recesses are formed in the surface during a premachining, and that a part of the surface that projects between the recesses is changed by polishing.

Figure 7:
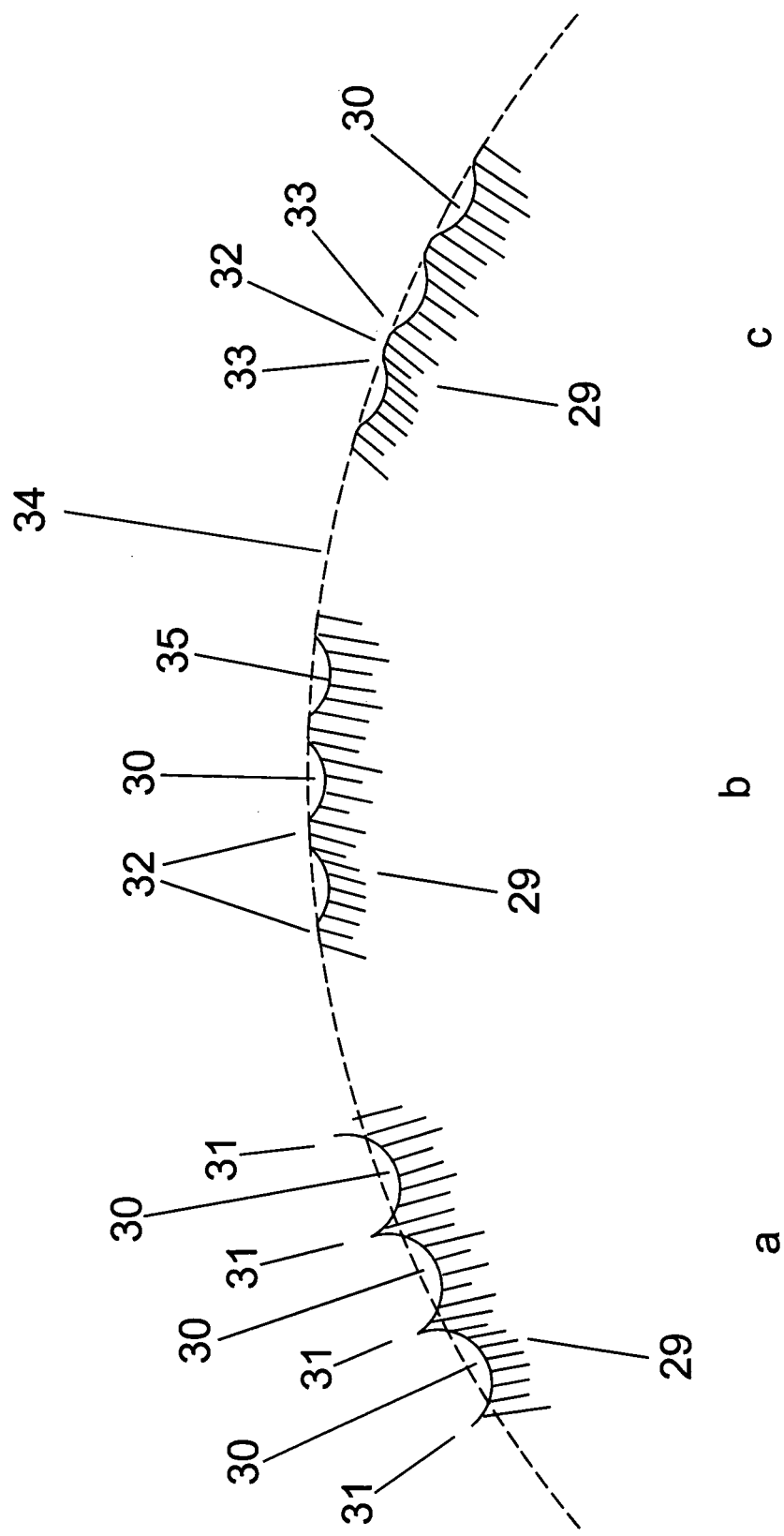
FIG. 7 is a schematic view of a surface structure in three different machining states.

FIG. 7 shows schematic sections a, b, c through a workpiece surface 29 of a workpiece that has been machined in accordance with an embodiment of the method according to the invention. As examples, the sections a, b and c show the workpiece surface 29 along a cylindrical, nominal surface 34. In this connection, the direction perpendicularly to the nominal surface 34 and the curvature of the nominal surface 34 are shown in excess proportions. The workpiece surface can, for example, provided as bearing or sliding surface for a bearing, for example, a bearing shell, a roll or a ball in a roller bearing, a ball bearing or a slide bearing.

Also reshaping surfaces on reshaping tools, for example, deep-drawing tools for sheet metal forging presses or reducing tools for wire, rod or pipe drawing can advantageously be machined by the method according to the invention.

Already during premachining, the workpiece surface 29 was brought to the shape required for the mechanical function of the workpiece under observation of corresponding tolerances. At the same time, or subsequently, a more or less regular wave structure with recesses 30 was shaped in the workpiece surface 29. The recesses 30 could, for example, be formed by hard turning, milling or grinding. Advantageously, the recesses 30 have a depth from 1 to 10 µm, advantageously 3 to 5 µm, and a width, or wave length, from 10 to 500 µm, preferably 100 to 250 µm. The section a shows the workpiece surface 29 in this machining state. Between the recesses 30, peaks or ridges 31 project. The peaks or ridges 31 partially project over the nominal surface 34.

Subsequently, the workpiece surface 29 was polished, meaning that the peaks or ridges 31 projecting between the recesses 30 were changed. This machining state is shown in the section b. The peaks or ridges 31 have partially been levelled, thus creating smooth sliding surfaces 32 extending along the nominal surface 34 and constituting approximately one third of the workpiece surface 29, whereas the remaining part is provided with recesses 30. The bases 35 of the recesses remain unchanged by the polishing. Together, the sliding surfaces 32 form a function surface of the workpiece, for example, a bearing surface or a reshaping surface. During operation, the function surface is supplied with lubricant from the recesses 30, so that a hydro-dynamic lubricant film occurs on the function surface. By changing the cutting, the surface relation between sliding surfaces 32 and recesses 30 can be controlled, which can influence the rigidity and the lubrication properties of the workpiece surface 29. A large cutting and thus a high slide surface share, for example 80%, of the workpiece surface 29, ensures a high rigidity of the function surface, whereas a small cutting and thus a low slide surface share, for example 20%, the ability of the surface 29 to adopt and distribute lubricant will be increased.

The section c shows a machining state of the workpiece surface 29 after a further polishing process, however, with a relatively soft polishing tool. During this process, the edges 33 of the sliding surfaces 32 were slightly rounded. The rounded edges 33 reduce the risk that the edges 33 tear apart the lubricant film, and thus contribute to maintaining the lubricant film.

When polishing the workpiece surface 29 provided with recesses 30, it is particularly important for the lubrication properties of the surface 29 of the resulting tool or the resulting machine component that the recesses 30 are not completely removed by the polishing, and that the material cut away during polishing is not rolled into the recesses 30. further, it is particularly essential for the rigidity of such a reshaping tool or such a machine component that the sliding surface 32 is polished in a carefully controlled, appropriate and uniform manner, so that firstly the total sliding surface 32 is even, and secondly that the metal grid structure existing just below the sliding surface 32 is not damaged by fatigue. This can only be ensured by a controlled, careful polishing process, which is, for example, provided by the polishing arrangement according to the invention.

While the present invention has been illustrated and described with respect to a particular embodiment thereof, it should be appreciated by those of ordinary skill in the art that various modifications to this invention may be made without departing from the spirit and scope of the present.

What is claimed is:

1. A polishing arrangement with a tool holder, at which a polishing tool is arranged and that interacts with a workpiece holder, in which is held a workpiece with a workpiece surface to be polished, the workpiece holder and the tool holder being movable in relation to one another in a first direction and in a second direction differing from the first direction, wherein, in a third direction that is perpendicular to the first and second directions and perpendicular to the workpiece surface, the tool holder is made to be flexible and has its smallest rigidity in the third direction;

wherein a contact pressure of the polishing tool on the workpiece is controllable, in particular in dependence of the position of the polishing tool on the workpiece; and wherein the polishing arrangement comprises a contact pressure arrangement operated by a pressure fluid, in particular pressure air, said contact pressure arrangement influencing the contact pressure.

2. The polishing arrangement according to claim 1, wherein, in the second direction, the tool holder has a rigidity that is at least five times larger than the rigidity in the third direction.

3. The polishing arrangement according to claim 1, wherein the tool holder has a length that is at least ten times its maximum effective diameter.

4. The polishing arrangement according to claim 3, wherein the oscillating movement has a frequency in the range from 20 to 100 Hz.

5. The polishing arrangement according to claim 3, wherein the oscillating movement has an amplitude in the range from 0.05 to 5 mm.

6. The polishing arrangement according to claim 3, wherein the drive is connected to a control device that changes an oscillation frequency and/or an oscillation amplitude.

7. The polishing arrangement according to claim 6, wherein the control device controls the relative movement in the second direction at a lower speed than the oscillating movement.

8. The polishing arrangement according to claim 1, wherein a drive is provided that overrides the relative movement between the workpiece holder and the polishing tool by an additional, oscillating movement.

9. The polishing arrangement according to claim 1, wherein the polishing tool is movable in the first direction and the workpiece holder is movable in the second direction.

10. The polishing arrangement according to claim 1, wherein the workpiece holder rotates at a speed in the range from 50 to 1000 rpm.

11. The polishing arrangement according to claim 1, wherein several tool holders with different flexibility properties are provided.

12. The polishing arrangement according to claim 11, wherein different polishing tools are provided with different coding, each coding only fitting with at least one predetermined tool holder.

13. The polishing arrangement according to claim 11, wherein the polishing tool is fixed to the tool holder by means of an intermediary holder.

14. The polishing arrangement according to claim 1, wherein the tool holder is arranged on a handling automat with at least two movement axes.

15. The polishing arrangement according to claim 14, wherein the drive and/or the tool holder and/or the handling automat is/are provided with movement and/or power sensors.

16. The polishing arrangement according to claim 1, wherein the workpiece holder and the tool holder have a changeable angle in relation to one another.

17. The polishing arrangement according to claim 1, wherein the pressure of the pressure fluid is controlled by a control device.

* * * * *